Figure 1:
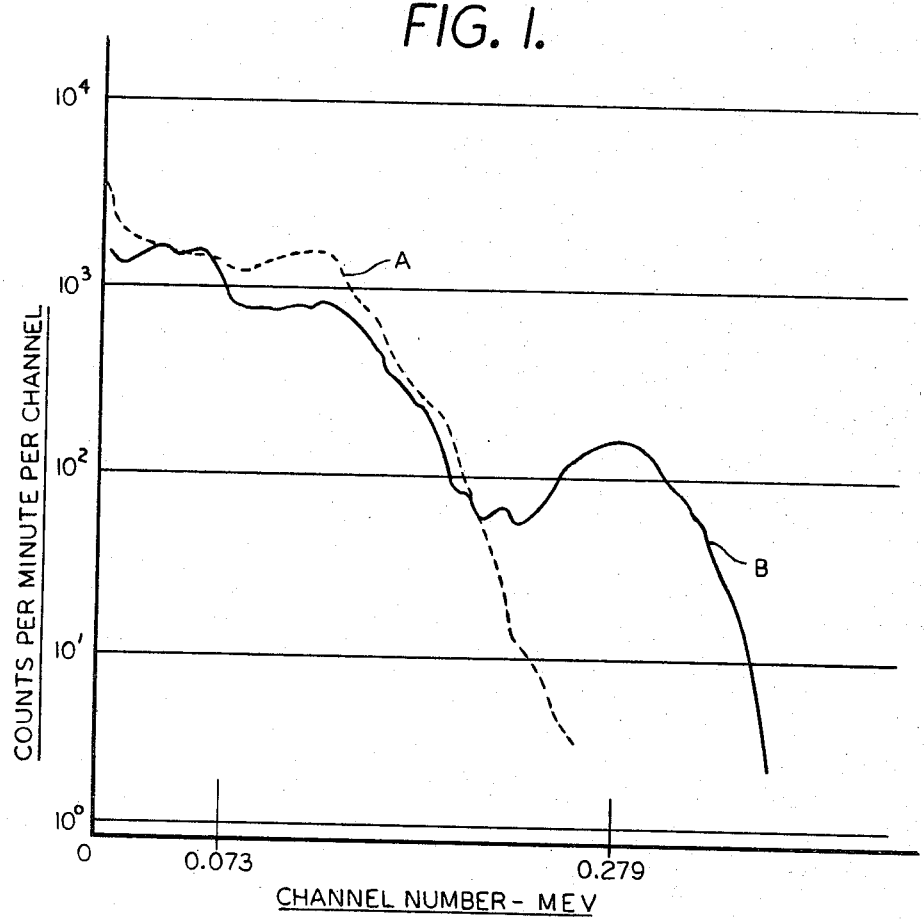

Dec. 5, 1967  S. R. SANDLER ET AL  3,356,616
PLASTIC SCINTILLATORS
Filed March 5, 1964

INVENTORS
STANLEY R. SANDLER
K. C. TSOU
JORDAN E. DANNIN
BY
ROBERT CALVERT
ATTORNEY.

United States Patent Office 3,356,616
Patented Dec. 5, 1967

3,356,616
PLASTIC SCINTILLATORS
Stanley R. Sandler, Philadelphia, Kwan C. Tsou, Huntingdon Valley, and Jordan E. Dannin, Philadelphia, Pa., assignors to The Borden Company, New York, N.Y., a corporation of New Jersey
Filed Mar. 5, 1964, Ser. No. 349,657
5 Claims. (Cl. 252—301.2)

This invention relates to a plastic scintillator composition for measuring the intensity of incident nuclear radiations and particularly to a scintillator containing, as the primary absorber, an organo-tin or lead styrene and, for best results, a copolymer of it with a vinyl compound.

In the scintillator art of measuring the intensity of beta and gamma radiations, it is customary to use three classes of materials as follows: a primary absorber which absorbs the ionizing radiation and converts a part of it to useful molecular excitation energy, a primary fluor which receives the energy from said absorber and transfers it to a wavelength shifter; and a wavelength shifter which converts the energy so received to the wavelength desired for final measurement. Our invention provides a primary absorber, sometimes called the solvent, for such a scintillator composition.

While commercial forms of aryl or alkyl tin and lead compounds have been known before, they give colored, hazy or opaque plastic scintillator compositions. Also they are not soluble, to the concentration necessary for best results, in the compounded mixture with the primary fluor and wavelength shifter. Finally, the previously mentioned aryl or alkyl tin and lead compounds show a strong scintillation quenching effect on the usual beta radiation; their incorporation into conventional scintillators gives a much lower pulse height, a measure of the effectiveness with such radiation, than does an otherwise comparable composition to which none of the tin or lead compound has been added.

We have now found that we can avoid the haziness of the compositions by preparing styrene derivatives of the said tin or lead compounds and by special purification of said compounds as made. Furthermore we can obtain the necessary solubility by copolymerizing such styrene derivatives of said compounds with vinyl aromatic monomers. Using such a copolymer of para-triphenyltin styrene with vinyl toluene, we have found the photoelectric peak absorption toward gamma rays increases with the proportion of the tin compound used in making the copolymer absorber. Thus we have found the absorption, in said photoelectric peak, when there were used 40 parts of para-triphenyl-tin styrene to 57 parts of vinyl toluene twice that found when the amounts were 20 and 77 parts, respectively.

The invention comprises the herein described scintillator compositions including the aryl or alkyl tin or lead styrenes or mixtures thereof. The invention comprises also copolymers of said styrenes with each other or with vinyl solvents and scintillator compositions containing said copolymers.

We have found that, in spite of the quenching effect of the lead and tin compounds in beta irradiation measurements we obtain an actual increase in the effectiveness, due to their incorporation, in response of the photoelectric peak corresponding to the gamma radiation energy.

This effect on the detection and resolution of the photoelectric peaks arising from gamma irradiation is shown graphically in the drawings.

FIG. 1 compares the results of a representative specimen of one of our compositions with anthracene, the material commonly accepted as representing the standard for beta irradiation detection with organic scintillators.

Figure 2:
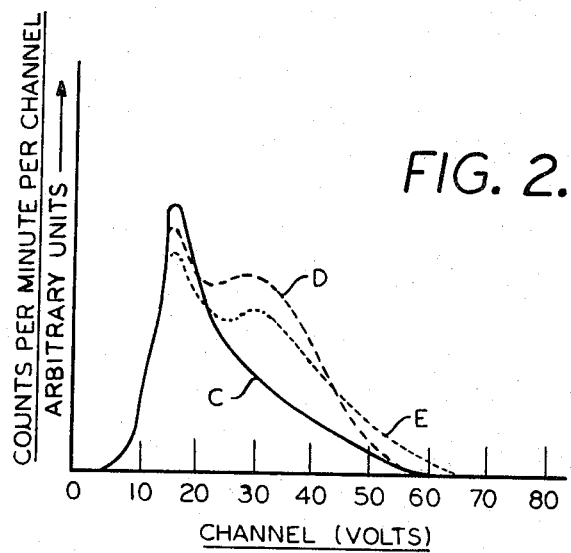

FIG. 2 compares two of our primary absorbers with each other, at different concentrations, and with a conventional primary absorber in which no lead or tin is present.

In FIG. 1, the radiation was from Hg-203. Graph "A" is for pure anthracene and "B" is for our plastic scintillator of the following composition:

Component: Parts by weight
Para-triphenyltin styrene (TPSnS), 20%
  copolymerized with vinyl toluene (VT),
  80% primary absorber _____ 96.95
2-phenyl-5-biphenylyl-1,3,4-oxadiazole (PBD),
  primary fluor _____ 3.00
1,4-bis 2-(5-phenyloxazolyl) benzene
  (POPOP), wavelength shifter _____ 0.05

The second peak in FIG. 1, at channel 0.279 million electron volts (mev.), is particularly significant as it corresponds to the energy for the photoelectric peak of the gamma rays. At this channel anthracene was ineffective and not of interest. The peak to the left, for 0.073 mev., is less important; it is a measure of the incidental low energy gamma rays from the radiation source.

FIG. 2 compares two of our new scintillator compositions toward irradiation, from Co 57 with a control material (in graph "C"). In each case, the scintillator contained 3 parts PBD for 97.00 parts of primary absorber of composition shown below. The Control material for graph "C" had no metal loadings. 2,4-DMS means 2,4-dimethylstyrene.

Graph: Primary absorber
C _____ 97% polyvinyltoluene (PVT).
D _____ Copolymer of 50% TpSnS+47% PVT.
E _____ Copolymer of 60% TPSnS+37% PVT.

As above, the peak or maintenance of effect to the right is significant, the Control falling sharply at this energy (voltage).

As to materials, we use with our primary absorber any conventional primary fluor as, for instance, the PBD identified above, p-terphenyl (PTP), 2,5-diphenyl oxazole (PPO), and 9,10-diphenyl anthracene.

Also, we may use any conventional wavelength shifter, e.g., POPOP; the methy or dimethyl derivatives thereof; 1,3,5-triphenyl pyrazolines and their substituted derivatives; 1,3-diphenyl pyrazoline; 1,1,4,4-tetraphenyl-1,3-butadiene and 7-diethylamino-4-methyl coumarin.

The primary fluors and wavelength shifters of the classes stated are soluble at the polymerization temperature of the mixture with our primary absorbers, when copolymerization is effected as described herein, as at 100° C.

Our primary absorber or solvent is any one of the tin or lead styrenes described or the corresponding alkyl metal styrenes. The absorber has the general formula $R_3$—M—$C_6H_4$—CR′=CR″$_2$. M is tin or lead. R is an aryl (the term including arylalkyl, alkylaryl, aryloxyaryl and alkoxyaryl), alkyl or alkenyl group, examples being any $C_{1-8}$ alkyl or alkenyl or $C_{6-10}$ aryl group, e.g., methyl, ethyl, butyl, octyl, and the corresponding alkenyls; o-, m-, or p-phenyl, the corresponding $C_{1-4}$ alkylphenyls in which the alkyl is methyl, ethyl, dimethyl or the like. R′ and R″ are the same or different monovalent components selected from the group consisting of hydrogen, $C_{1-8}$ alkyls and alkenyls such as methyl, ethyl, butyl, vinyl, methylvinyl, ethylvinyl and mono- and di- $C_{1-4}$ alkyl vinyls.

In the preferred embodiment, we use, as the primary absorber, the copolymer of the aryl or alkyl tin or lead styrene in the amount of about 5–70 parts and suitably 10–70 parts with a vinyl monomer in amount to make 100 parts total weight of the copolymer. Examples of said vinyl monomer that illustrate the class used are the styrenes such as vinyl toluene, mono- or dimethyl or other $C_{1-4}$ alkyl vinyl toluenes, dimethyl or any other di-$C_{1-4}$ alkyl styrenes. Some others are styrene, phenoxystyrene, benzylstyrene and other alkyl, aryl, alkoxy or other aryl derivatives of styrene.

To overcome the difficulties due to lack of clarity or haziness of the scintillator compositions containing the aryl or alkyl tin or lead compound of kind described, we purify these compounds as made available from preparations according to methods described in the literature. Thus the organo-tin or lead styrenes is separated from the impurities to the stage of being soluble to the extent of at least 50 parts, without haze development, in 100 parts of polymeric vinyl toluene. We purify the para-triphenyltin or lead styrene or other selected tin or lead derivative of conventional quality, for example, as follows, before use in the scintillator. We dissolve the aryl tin or lead styrene compound, as first synthesized, to near saturation in warm ligroin, at about 30°–60° C., filter the resulting solution to remove insolubles therefrom, and then cool the filtrate so that the lead or tin derivative crystallizes. Ordinarily we complete this type of purification by repeating the solution of the crystals so obtained in warm ligroin, filtering and then cooling the filtrate, to crystallize said compound, and finally washing the separated crystals with a small proportion of fresh cold ligroin.

Also we may purify the organo-lead or tin compounds, first made, by column chromatography techniques. Here a solution of the lead or tin derivative, e.g., the aryl tin (or lead) styrene, is dissolved in a small volume of a suitable volatile solvent liquid such as benzene and passed through a granular alumina absorbent at a pH of about 7 contained in a hexane-jacketed column. The organo-metallic compound is eluted from the alumina by adding fresh ligroin solvent at the top of the column in such amount that the organo metallic compound begins to issue in quantity from the bottom of the column. Fractions of the elutriate are collected in several separate receivers and isolated by vacuum evaporation of the solvent. The melting points of the residue from each fraction are determined in addition to its solubility and solution clarity in vinyl toluene.

In copolymerizing the aryl tin or lead styrenes with vinyl toluene or the like, we follow the usual technique, suitably thermal, as by heating the monomers to be copolymerized to a temperature at least as high as to cause solution of the mixture but below decomposition of any component thereof. We may also use a free radical initiator for vinyl bond polymerization, provided it is one that causes no clouding or haziness of the product. Examples of initiators which may be used are nonmetallic free radical generators such as benzoyl peroxide, azo-bis-isobutyronitrile, cumene hydroperoxide, and t-butyl hydroperoxide. The selected initiator is used in the amount of about 0.01% to 1.0% of the total weight of comonomers and in a nonaqueous medium, at about 90° to 110° C.

If it is desired to prepare the organo-metallic styrenes or the like, they may be synthesized as illustrated by the following preparation of 2-triphenyllead-5-methyl styrene.

To 0.05 mole magnesium in 50 ml. tetrahydrofuran (THF) was added 0.1 mole of 3-chloro-6-methylstyrene in 50 ml. THF. After the reaction was complete, as evidenced by the appearance of a green color and the disappearance of all of the magnesium, 20 f. triphenyllead chloride in 100 ml. THF was added. The solution was refluxed for 1 hour and the THF then distilled away, to yield 14.8 g. (55% of theory) and 2-triphenyllead-5-methylstyrene, M.P. 101°–105° C. This cloudy product was then purified by the crystallization procedure described above, until free of materials insoluble in vinyl toluene.

*Analysis.*—Calcd. for $C_{25}H_{24}Pb$: C, 58.4%; H, 4.3%; Pb, 37.3%. Found: C, 58.35%; H, 4.41%; Pb, 36.08%.

Any of the other organo-metal styrenes used by us may be made in the same manner, as by substituting tin for lead and any organo group or groups R (see formula above) for phenyl in the lead intermediate here used. Likewise the styrene component may be changed to a substituted styrene by use of any of the groups disclosed for R' and R'' in said formula.

The copolymerization of the organo-metal styrene with a vinyl solvent therefor is illustrated by the following procedure, using the p-triphenylead styrene (TPPbS) and vinyl toluene (VT).

The compounds are weighed into a suitable container, degassed by several freeze-thaw steps under nitrogen and sealed. Thermal copolymerization of both monomers is carried out in a constant temperature bath set at 90°–110° C. for approximately 7–10 days. The sample was removed and annealed slowly to yield a transparent clear plastic which was polished for scintillation counting.

Suitable proportions of the several constituents of the scintillator are as follows, proportions here and elsewhere herein being given as parts by weight unless specifically stated as moles.

|  | Parts | |
| --- | --- | --- |
|  | Permissible | Recommended |
| Primary absorber | 95–99 | 97 |
| Primary fluor | 1–5 | 3 |
| Wavelength shifter | 0–0.1 | 0.05 |

While the amounts of the primary fluor and wavelength shifter may be larger than shown, such increase is unnecessary and uneconomical Also the amounts of them must not exceed those that can be dissolved in the scintillator.

Examples 1–8

The following table shows the composition of a number of plastic scintillators made in accordance with the invention. Our primary absorbers, appearing in the second column of this table, are copolymers of the organo-metal styrene and vinyl toluene in the amounts shown. The copolymer is used in proportion of 94.9–97 parts, as it will appear, to make 100 parts total with the other components in the amounts shown.

TABLE 1.—LEAD AND TIN ORGANO-METALLIC SCINTILLATORS

| Ex. No. | Primary Absorber, Copolymer of— | Primary Fluor | Wavelength Shifter |
| --- | --- | --- | --- |
| 1 | 10 para-triphenyllead styrene, 86.95 VT | 3 PTP | 0.05 POPOP. |
| 2 | 20 para-triphenyllead styrene, 76.95 2,4-DMS | 3 PBD |  |
| 3 | 30 para-triphenyllead styrene, 66.43 VT | 3.5 PTP | 0.07 dimethyl POPOP. |
| 4 | 40 para-triphenyllead styrene, 56.43 VT | 3.5 PTP | Do. |
| 5 | 20 para-triphenyltin styrene, 76.95 VT | 3 PBD | 0.05 POPOP. |
| 6 | 40 para-triphenyltin styrene, 56.95 | 3 PBD | 0.05 POPOP. |
| 7 | 50 para-triphenyltin styrene, 47 2,4-DMS | 3 PBD | 0. |
| 8 | 60 para-triphenyltin styrene, 37 2,4-DMS | 3 PBD | 0. |

In Example 1, for instance, 10 parts by weight of a triphenylleadstyrene are mixed with 86.95 parts of vinyl toluene, 3 parts of PTP, and 0.05 parts of POPOP. The whole is then heated to the solubility point, as to 90° C. or somewhat higher, until the whole composition is polymerized to a clear plastic. This requires 7–10 days. The prepolymer solution can be molded or cast to a solid mass and, after being cooled, can be formed to the desired shape and size for use in testing.

The composition of Example 5 is that compared with the standard anthracene, in FIG. 1. Related scintillator compositions to Example 5 are those reported graphically in FIG. 2.

The tests reported in FIG. 2 were made with discs 0.5 inches thick and $1\frac{3}{16}$ inch diameter, polished on the side which is to be in contact with the measuring device including, as the principal element, a photomultiplier tube with Dow Corning silicone grease type C2–0057. The gamma radiations used for the tests were from Co-57.

The conditions of test reported in FIG. 1 were as follows:

The sample was in the form of a $1\frac{5}{8}$ in. diameter by 1 in. thick cylinder. This was optically coupled to the photomultiplier tube with Dow Corning silicone grease type C2–0057 (Lot No. 48). A ½-mil-thick aluminum foil was used to cover the phosphor and act as an optical reflector. The pulse height response of the scintillator of Example 5 was compared to a 1½-in. anthracene phosphor.

The gamma photons from Cesium-137, Mercury-203, and Cadmium-109 were used for excitation of the phosphors. These sources were located directly on top of the reflector. A ¼-in.-thick aluminum sheet was interposed between the source and phosphor to demonstrate that the observed pulse height distribution was due to gamma photons and did not include a component due to beta. The pulse height curves for Cesium-137 with and without the aluminum absorber matched exactly, confirming this point. The gamma scintillation work was carried out with a multichannel analyzer instrument.

*Example 9*

The terpolymer of triphenyllead styrene and triphenyltin styrene with vinyl toluene may be prepared using the techniques previously described in Examples 1–8. Advantage may thus be taken of the higher photoelectric absorption of the lead monomer.

*Example 10*

In any of the compositions of Examples 1–9, the organo-tin or organo-lead monomers used therein are substituted by an equal weight of a mixture of the tin or lead monomers and thermal or initiator polymerization is effected as described. The two monomers may be copolymerized alone or with vinyl toluene or any other said vinyl monomer.

Suitable proportions are as follows: 10–70 parts of the organo-tin styrene (styrene derivative described above) and 10–70 parts of like lead compound. When the terpolymer is to be used, the two together are in amount to constitute 30%–90% of the final terpolymer with vinyl toluene or other said vinyl monomer in proportion to make 100% total.

It will be understood that it is intended to cover all changes and modifications of the examples of the invention herein chosen for the purpose of illustration which do not constitute departures from the spirit and scope of the invention.

We claim:

1. A scintillator comprising (1), as the primary absorber, the copolymer of a monomer of the formula $R_3-M-C_6H_4-CR'=CR''_2$, in which M is tin, R is selected from the group consisting of $C_{1-8}$ alkyls and alkenyls and $C_{6-10}$ aryl, arylalkyl, alkylaryl, acryloxyaryl, and alkoxyaryl groups, and R′ and R″ are monovalent components selected from the group consisting of hydrogen and $C_{1-8}$ alkyls and alkenyls, with a comonomer of the same formula except that M is lead, in the proportion of 10–90 parts of one of said comonomers for 100 parts total of the copolymer and (2) a primary fluor, the absorber and fluor being in a clear plastic solution in each other.

2. The scintillator of claim 1 wherein said copolymer is a copolymer of para-triphenyllead styrene and para-triphenyltin styrene in the proportion of 10–90 parts of lead compound to 100 total weight of said copolymer.

3. A scintillator of claim 1 including a wavelength shifter dissolved therein.

4. The scintillator of claim 3, the proportions of the primary fluor and wavelength shifter being about 1–5 parts and up to 0.1 part, respectively, for 100 parts by weight of the scintillator.

5. The scintillator of claim 1, the primary absorber being soluble to a concentration of at least 50 parts in 100 parts of vinyl toluene without haze development in the vinyl toluene.

References Cited

UNITED STATES PATENTS

| 3,041,287 | 6/1962 | Hyman | 252—301.2 |
| 3,071,607 | 1/1963 | Juenge | 260—80 |
| 3,244,637 | 4/1966 | Tsou et al. | 252—301.2 |

FOREIGN PATENTS 1,217,343  12/1959  France.

OTHER REFERENCES

Agnew, Chem., 37 Jahrg. 1961, No. 6, pages 197–208.

TOBIAS E. LEVOW, *Primary Examiner.*

HELEN M. McCARTHY, *Examiner.*

R. D. EDMONDS, *Assistant Examiner.*